United States Patent [19]
Lee

[11] Patent Number: 5,900,702
[45] Date of Patent: May 4, 1999

[54] OSCILLATION VOLTAGE STABILIZER

[75] Inventor: Soo-Chan Lee, Suwon, Rep. of Korea

[73] Assignee: SamSung Electronics Co., Ltd., Suwon, Rep. of Korea

[21] Appl. No.: 08/850,819

[22] Filed: May 2, 1997

[30] Foreign Application Priority Data

May 2, 1996 [KR] Rep. of Korea ...................... 96-14224

[51] Int. Cl.$^6$ .............................. G09G 1/04; H01J 29/70
[52] U.S. Cl. ........................................... 315/408; 315/411
[58] Field of Search ................................... 315/408, 409, 315/410, 411, 386

[56] References Cited

U.S. PATENT DOCUMENTS

| | | | |
|---|---|---|---|
| 4,318,036 | 3/1982 | Bart et al. | 315/408 |
| 4,679,131 | 7/1987 | Filliman | 315/411 |
| 5,304,898 | 4/1994 | Kataoka et al. | 315/411 |
| 5,353,187 | 10/1994 | Favreau et al. | 315/411 |
| 5,394,188 | 2/1995 | Ohira | 348/327 |
| 5,430,596 | 7/1995 | Hamaguchi et al. | 315/411 |
| 5,627,437 | 5/1997 | Kim | 315/399 |
| 5,656,890 | 8/1997 | Park | 315/411 |

Primary Examiner—Gregory C. Issing
Attorney, Agent, or Firm—Robert E. Bushnell, Esq.

[57] ABSTRACT

A display device includes a capacitor which charges or discharges, and an oscillation voltage stabilizing circuit, which prevents an abnormal oscillation by constantly maintaining the oscillation voltage of a pulse width modulation circuit which oscillates according to a time constant of a resistor. The oscillation voltage stabilizing circuit consists of: a pulse input circuit, for detecting a high voltage induced to an output transformer; a forced trigger circuit, for inverting and amplifying a pulse transmitted from the pulse input circuit, and transmitting it to a capacitor of the pulse width modulation circuit; a charge storage device, connected to a trigger terminal of the forced trigger circuit; a signal converter, for converting the output signal of the forced trigger circuit into a voltage; a voltage comparator having a first switching device which is opened or closed in accordance with the voltage transmitted from the signal converter; a control circuit having a second switching device which is opened or closed according to a state of the voltage comparator; and a resistor circuit, for varying its resistance in response to a control signal transmitted from the control circuit.

12 Claims, 5 Drawing Sheets

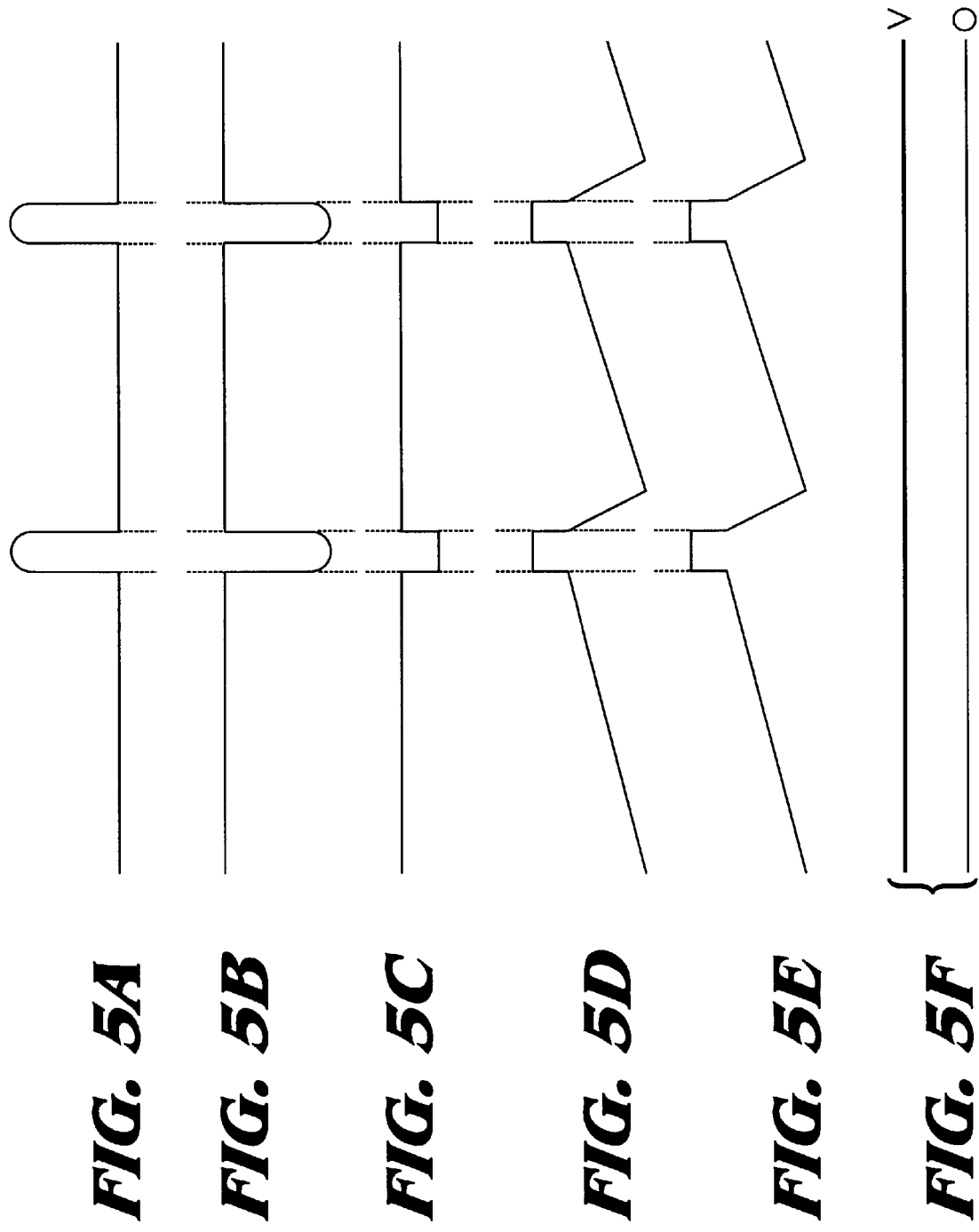

OSCILLATION VOLTAGE STABILIZER

CLAIM OF PRIORITY

This application makes reference to, incorporates the same herein, and claims all benefits accruing under 35 U.S.C. §119 from an application for DISPLAY DEVICE HAVING AN OSCILLATION VOLTAGE STABILIZING CIRCUIT earlier filed in the Korean Industrial Property Office on the $2^{nd}$ day of May 1996 and there duly assigned Ser. No. 14224/1996, a copy of which application is annexed hereto.

BACKGROUND OF THE INVENTION

1. Field of the Invention

The present invention relates to an oscillation voltage stabilizing circuit. Specifically, the present invention relates to a circuit for stabilizing the oscillator voltage of an oscillation circuit of which horizontal and high voltage circuits are separately or integrally formed.

2. Discussion of Related Art

A display device consists of a horizontal oscillator circuit, horizontal drive circuit, horizontal output circuit, and horizontal deflection yoke. A flyback transformer (FBT) is used to produce a high voltage that is stabilized by a high voltage stabilizing circuit and an X-ray protection circuit.

The following patents each disclose features of the present invention but do not teach or suggest the specifically recited oscillation voltage stabilizer thereof.

U.S. Pat. No. 5,430,596 to Hamaguchi et al., entitled CRT Protector Circuit, U.S. Pat. No. 5,394,188 to Ohira, entitled High Voltage Stabilizing Circuit For Use In Color Television Receivers, U.S. Pat. No. 5,353,187 to Favreu et al., entitled Safety Circuits For A Television Receiver, and U.S. Pat. No. 5,304,898 to Kataoka et al., entitled High Voltage Generating Circuit.

Typically in contemporary practice a blocking oscillator circuit, in the form of an integrated circuit, is used for the horizontal oscillator circuit. The horizontal drive circuit supplies the base current for the horizontal output circuit to open or close an output transistor, and corrects the waveforms of the horizontal oscillation circuit. Since a pulse waveform can be utilized as a voltage to drive an output, the output can be directly driven only if the horizontal oscillator output is large enough. I have found however, that when the output circuit is used as an output load for an oscillator circuit, the oscillation frequency tends to be unstable because of large currents. Therefore, a drive circuit can be utilized as a buffer amplifier. The X-ray protection circuit stops the horizontal oscillator circuit when the output voltage generated by the FBT exceeds a predetermined limit. This circuit protects the horizontal and high voltage oscillator circuits when X-rays are excessively radiated, and when a lead wire is separated from a deflection yoke (DY). I have also noticed that since these horizontal and high voltage oscillator circuits do not have a stabilizing circuit, a high voltage or current caused by an abnormal oscillation in an output circuit results in circuit element damage.

SUMMARY OF THE INVENTION

Accordingly, the present invention is directed to an oscillation voltage stabilizing circuit that substantially obviates one or more of the limitations and disadvantages of the related art.

An objective of the present invention is to provide an oscillation voltage stabilizing circuit for keeping the oscillation voltage constant, thereby preventing abnormal oscillations.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a display device includes a capacitor, which charges and discharges, and an oscillation voltage stabilizing circuit, which prevents abnormal oscillations by constantly maintaining the oscillation voltage of a pulse width modulation integrated circuit that oscillates according to the time constant of a resistor. The oscillation voltage stabilizing circuit may use a pulse input circuit, for detecting the high voltage induced to an output transformer; a forced trigger circuit, for inverted-amplifying a pulse transmitted from the pulse input circuit, and outputting it to a capacitor terminal of a pulse width modulation integrated circuit; a charge storage device, connected to a trigger terminal of the forced trigger circuit; a signal convertor, for converting the output signal of the forced trigger circuit into a voltage; a voltage comparator having a first switching device which is opened or closed according to the voltage transmitted by the signal convertor; a control circuit having a second switching device which is opened or closed according to a state of the voltage comparator; and a resistor circuit, for varying its resistance in response to a control signal transmitted from the control circuit.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 5A–5F are waveform diagrams of nodes shown in FIG. 4.

DETAILED DESCRIPTION OF PREFERRED EMBODIMENT

Reference will now be made in detail to the preferred embodiments of the present invention, examples of which are illustrated in the accompanying drawings.

Figure 1:
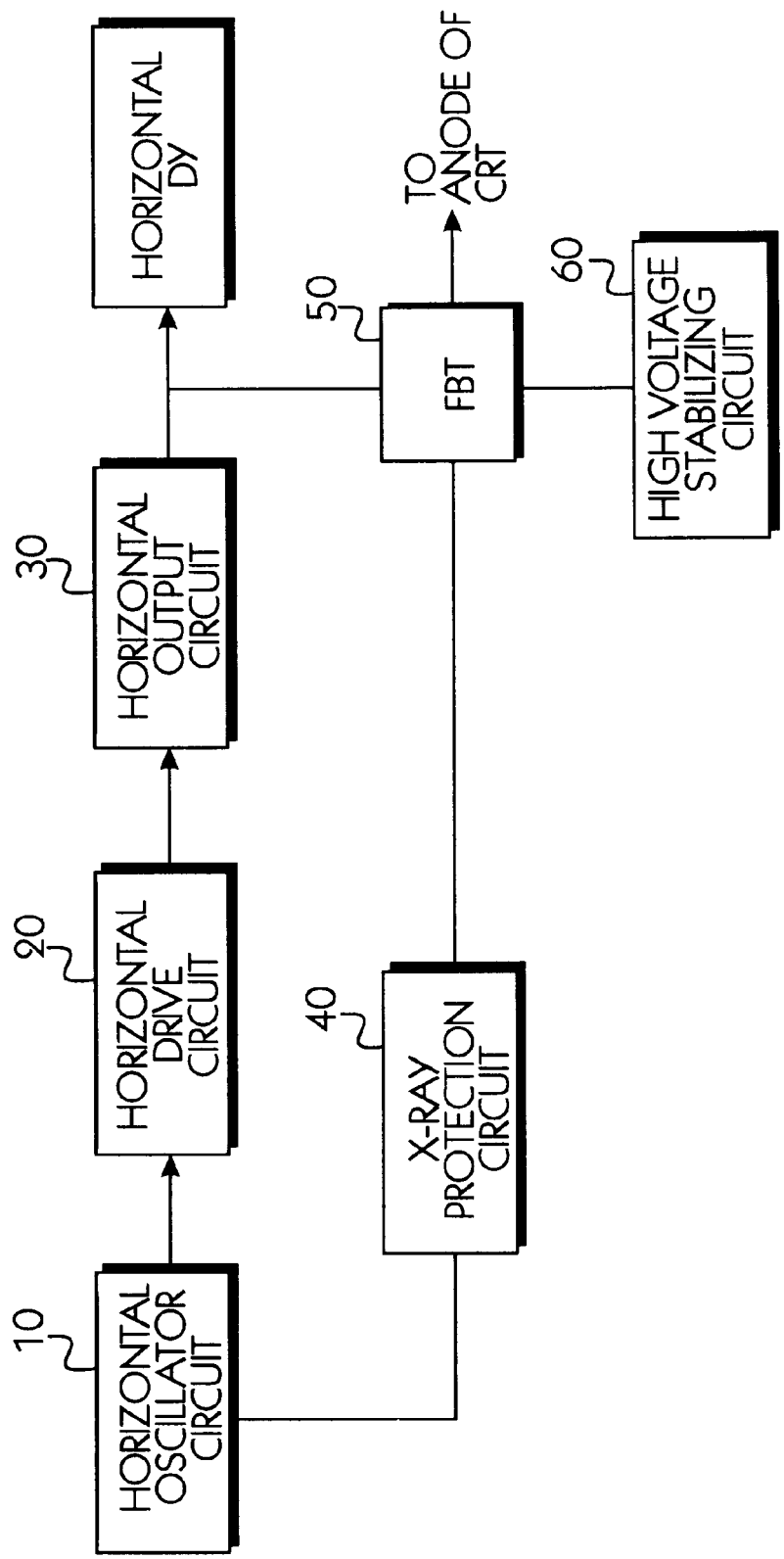
FIG. 1 is a block diagram of a horizontal circuit for a display device.

As shown in FIG. 1, a display device consists of a horizontal oscillator circuit 10, a horizontal drive circuit 20, a horizontal output circuit 30 and a horizontal deflection yoke DY. A flyback transformer 50 is used to produce a high voltage that is stabilized by a high voltage stabilizing circuit 60 and an X-ray protection circuit 40.

The above-noted circuit of FIG. 1 corresponds to the display device discussed in the previous Discussion of Related Art.

Figure 2:
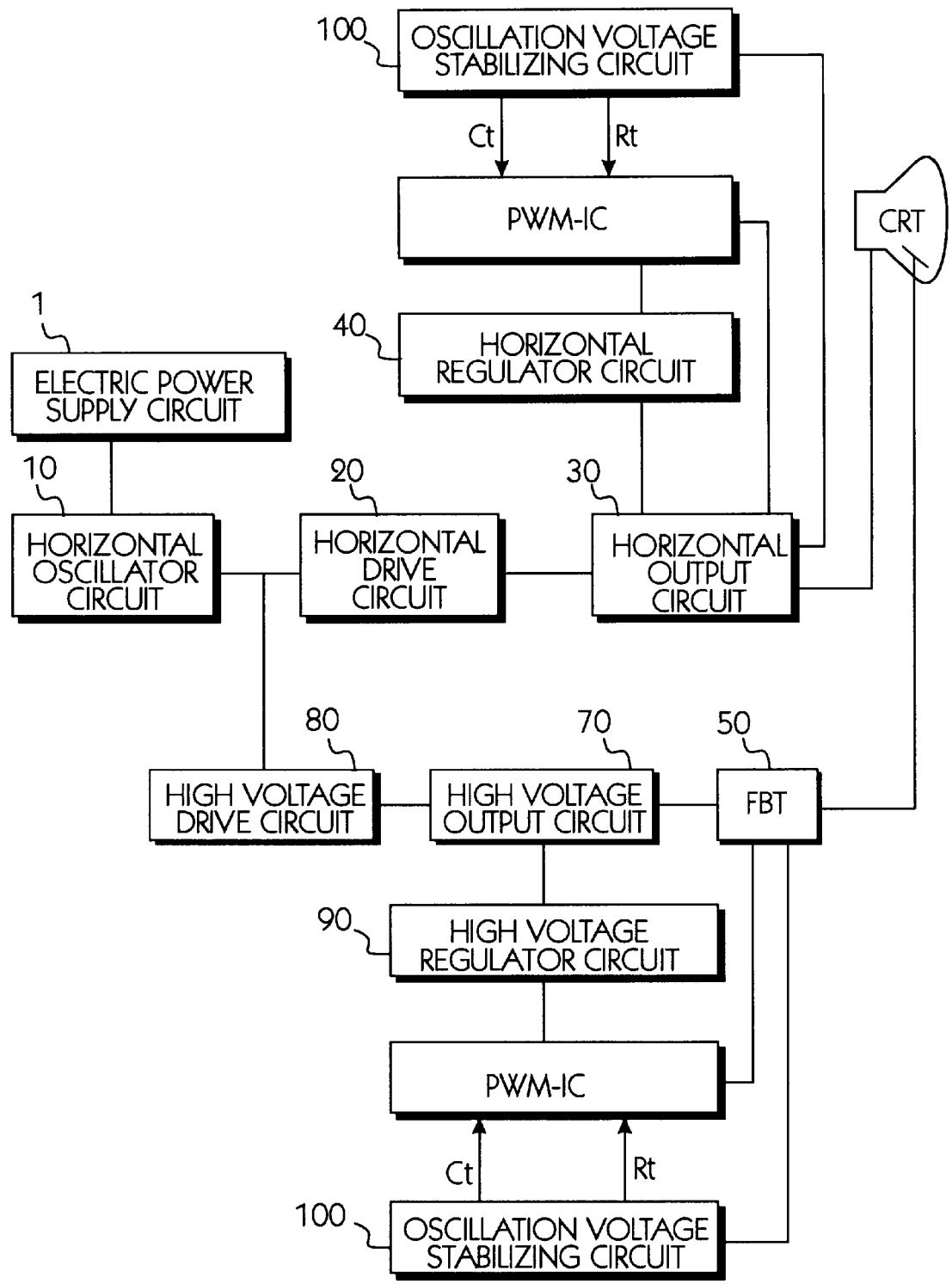
FIG. 2 is a block diagram of a display device including an oscillation voltage stabilizing circuit according to the present invention.

A horizontal circuit and high voltage circuit are separated in the circuit of FIG. 2, but needless to say, the present invention is also effective in an integrally formed circuit. As shown in FIG. 2, the horizontal circuit consists of horizontal drive circuit 20, horizontal output circuit 30, horizontal regulator circuit 40, PWM-IC, and oscillation voltage stabilizing circuit 100. An electric power supply circuit 1 converts an alternating voltage into a direct voltage. The horizontal oscillator circuit 10 generates sawtooth waveforms in accordance with the charging/discharging characteristic of a capacitor using the electric power supplied by the electric power supply circuit 1, and oscillates at a frequency. The horizontal drive circuit 20 amplifies the output pulses of the horizontal oscillator circuit 10 to supply a base current for turning a horizontal output transistor on or off to correct the waveforms transmitted from the horizontal oscillator circuit 10. The horizontal output circuit 30 generates a sawtooth waveform current through deflection coils in accordance with the switching operation of the horizontal output transistor. The horizontal regulator circuit 40 transmits signals for regulating the horizontal size of a screen to the horizontal output circuit 30. The PWM-IC provides a regulated duty cycle value for controlling the signal, which regulates the horizontal size of the screen, to the horizontal regulator circuit 40. The oscillation voltage stabilizing circuit 100 stabilizes the oscillation operation of the PWM-IC.

The high voltage circuit consists of: the high voltage drive circuit 60, for inducing a high voltage at the anode of a cathode-ray tube (CRT) using the oscillation frequency of the horizontal oscillator circuit 10; a high voltage output circuit 70, for amplifying the output voltage supplied by the high voltage drive circuit 60 to supply a driving voltage for an FBT 80; a high voltage regulator circuit 90, for regulating the output periods of the high voltage output circuit 70, another PWM-IC, and another oscillation voltage stabilizing circuit 100.

Figure 3:
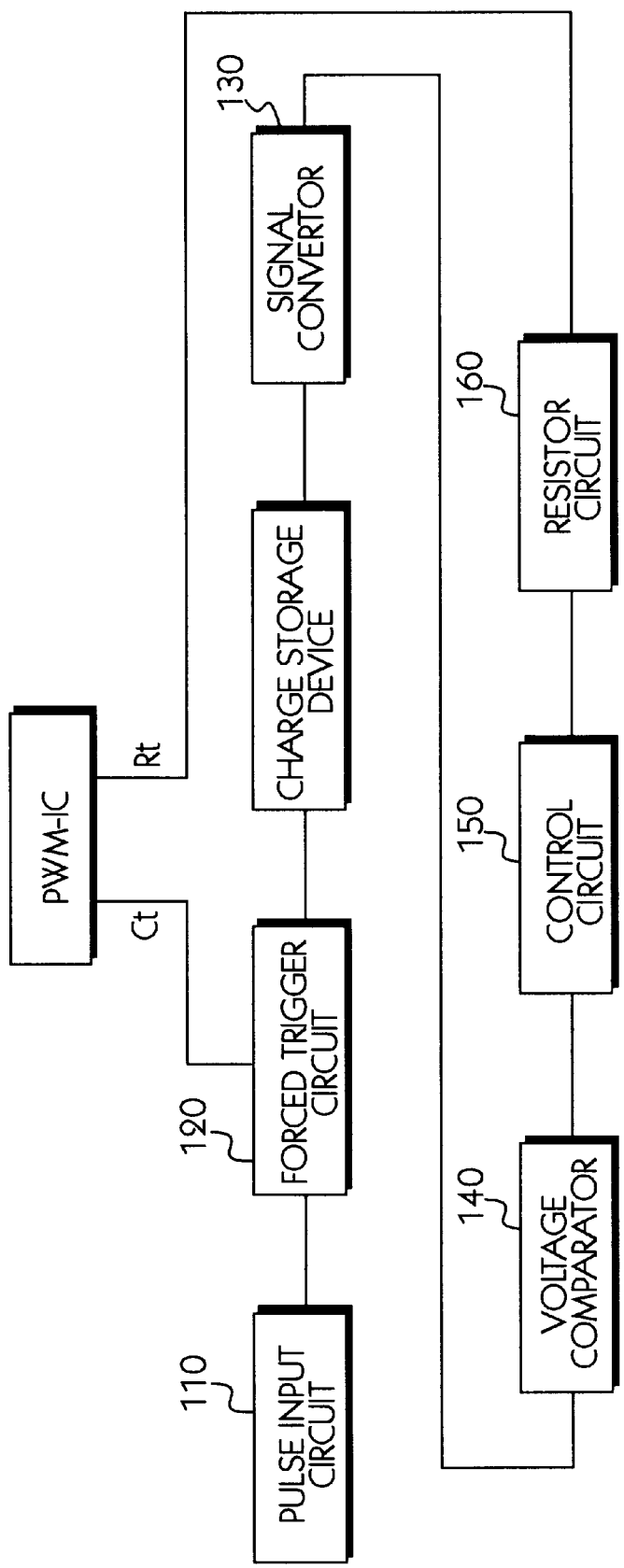
FIG. 3 is a block diagram illustrating the relationship between a pulse width modulation integrated circuit (PWM-IC) and oscillation voltage stabilizing circuit.

The horizontal circuit and high voltage circuit are separated in the circuit of FIG. 3, but needless to say, the present invention is also effective in an integrally formed circuit. As shown in FIG. 3, each oscillation voltage stabilizing circuit 100 has a pulse input circuit 110, for sensing the voltage induced by an FBT (or a horizontal output transformer); a forced trigger circuit 120, for inverting and amplifying a pulse transmitted from the pulse input circuit 110, and for triggering the amplified pulse to send it to the capacitor terminal of the PWM-IC; a charge storage device C1, which is utilized as a trigger terminal of the forced trigger circuit 120; a signal converter 130, for converting the output signals transmitted by the forced trigger circuit 120 into a voltage; a voltage comparator 140, having a first switching device which is opened or closed according to the voltage supplied from the signal converter 130; a control circuit 150, having a second switching device whose opening or closing depends on the condition of the first switching device in the voltage comparator 150; and a resistor circuit 160, for maintaining a resistance at a predetermined value in response to the control signal generated by the control circuit 150, thereby stabilizing the oscillation voltage generated by the PWM-IC when an abnormal oscillation is detected.

Figure 4:
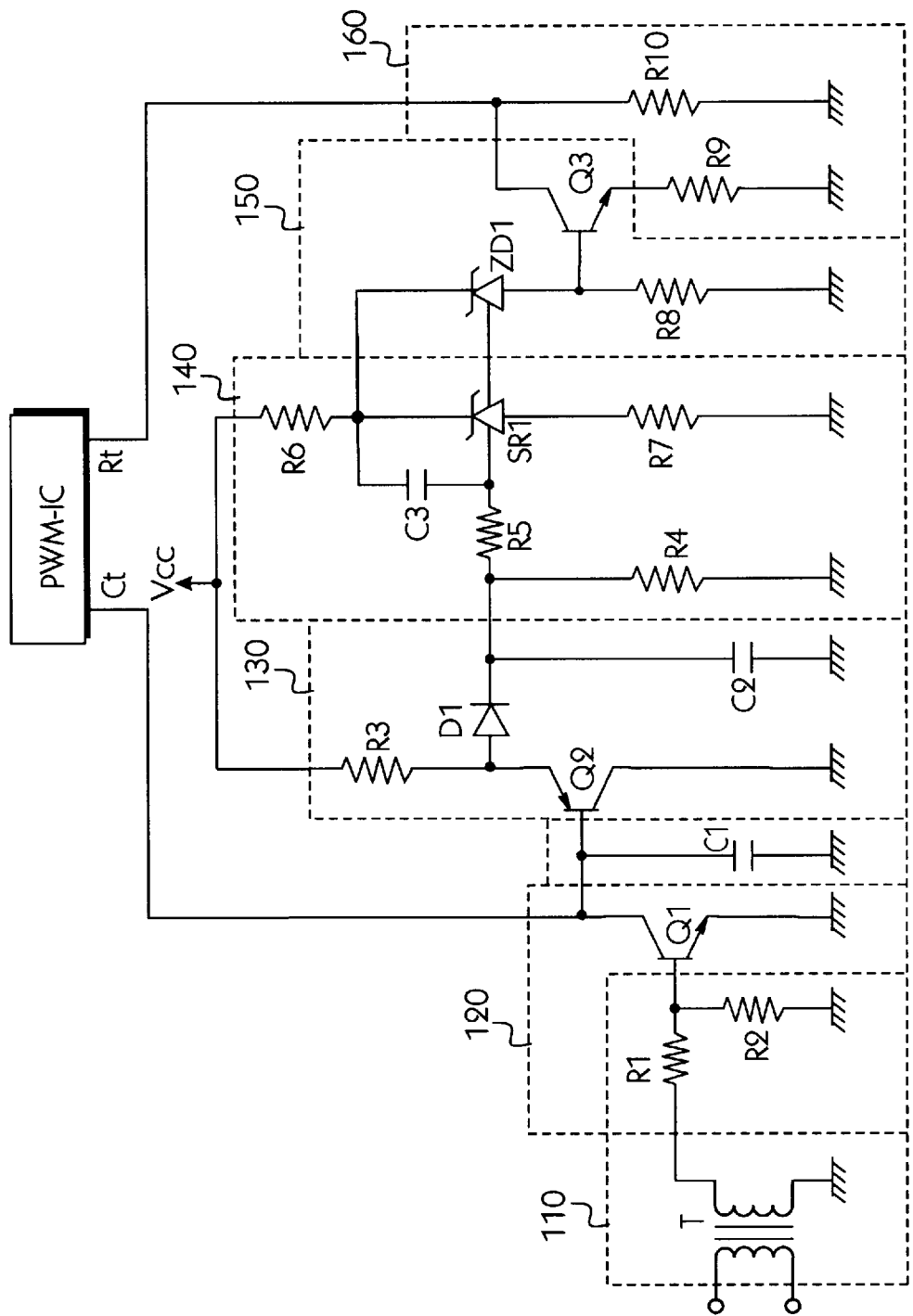
FIG. 4 is a circuit diagram of FIG. 3.

As shown in FIG. 4, the pulse input circuit 110 is the secondary coil of an output transformer T. Resistors R1 and R2 detect abnormally high voltages generated by the output transformer T. The forced trigger circuit 120 includes the first transistor Q1 which is turned on or off by the voltage transmitted by the pulse input circuit 110. The voltage is detected and divided by resistors R1 and R2, and supplied to the base terminal of the first transistor Q1. The collector of the first transistor Q1 connects the capacitor terminal Ct of the PWM-IC to capacitor C1 which is a charge storage device utilized as the switching trigger terminal of the first transistor Q1.

The signal convertor 130 is constructed with a second transistor Q2 whose base is connected to the collector of the first transistor Q1; a resistor R3, for transmitting a reference voltage Vcc to the emitter of the second transistor Q2; a rectifying diode D1; and a smoothing capacitor C2.

The voltage comparator 140 has resistors R4 and R5, for dividing the voltage from signal convertor 130; a shunt regulator SR1, which is opened or closed according to the voltage supplied to its reference terminal; and resistors R6 and R7, which are respectively connected to the anode and cathode of the shunt regulator SR1.

The control circuit 150 has zener diode ZD1, which operates according to the condition of shunt regulator SR1; and a third transistor Q3, which is turned on or off according to the voltage input to its base through resistor R8 and zener diode ZD1.

The resistor circuit 160 consists of resistors R9 and R10 which are respectively connected to the emitter and collector of the third transistor Q3. When the third transistor Q3 is closed, resistors R9 and R10 operate in parallel, while only resistor R10 operates when the third transistor Q3 is opened.

With reference to FIGS. 5A–5F, the operation and effect of the present invention are described below in detail. A phase of a voltage of the waveform of FIG. 5A is inverted, so a voltage of the waveform of FIG. 5B is induced in the secondary coil of the output transformer T. When the voltage detected and divided by resistors R1 and R2 is supplied to the base of the first transistor Q1, the waveform of FIG. 5C is formed. This waveform is amplified by the first transistor Q1, and the waveform of FIG. 5D is generated. In this case, capacitor C1 is utilized as a trigger. The signal then is supplied to the base of the second transistor Q2. When the voltage detected by resistors R1 and R2 exceeds a predetermined limit, or periods of the capacitor connection terminal Ct of PWM-IC change, an abnormal oscillation can occur.

The second transistor Q2 only transmits the signal. The signal at the emitter of the transistor forms the waveform of FIG. 5E. The voltage rectified by the diode D1 and capacitor C2, which are connected to the emitter of the second transistor Q2, form the waveform FIG. 5F. The voltage is divided by resistors R4 and R5, and then supplied to the reference terminal of the shunt regulator SR1. When the rectified voltage exceeds 2.5V, the anode and cathode of the shunt regulator SR1 are opened, resulting in decreasing the voltage at the anode to zero. The base potential of the third transistor Q3, transmitted through zener diode ZD1, decreases to zero, so that the third transistor Q3 in the control circuit 150 is turned off. The resistance of PWM-IC changes from a parallel resistance of resistors R10 and R9 to the constant resistance of resistor R10. Consequently, the output of the PWM-IC is stabilized, and an abnormal oscillation is prevented, thus stabilizing the system.

When the periods of an oscillation voltage are changed by an abnormal oscillation, the voltage is transmitted to the collector of the first transistor Q1 through the capacitor connection terminal Ct of PWM-IC, and then supplied to the reference terminal of shunt regulator SR1 through the second transistor Q2 and diode D1. The operation of the third transistor Q3 depends on the switching operation of zener diode ZD1. The resistance of PWM-IC changes from the parallel resistance resistors R9 and R10 to the constant resistance of resistor R10, so the oscillation voltage of PWM-IC is stabilized.

As described above, the present invention prevents damage to the circuit which can occur because of an overvoltage or abnormal oscillation of an output transformer in a horizontal or high voltage circuit. It also keeps an oscillation voltage constant so as to stabilize a system operation, thereby improving the quality of a display device.

It will be apparent to those skilled in the art that various modifications and variations can be made in an oscillation voltage stabilizing circuit of the present invention without deviating from the spirit or scope of the invention. Thus, it is intended that the present invention cover the modifications and variations of this invention provided they come within the scope of the appended claims and their equivalents.

What is claimed is:

1. An oscillation voltage stabilizer for a display device having a capacitor, which charges or discharges, preventing an abnormal oscillation by constantly maintaining the oscillation voltage generated by a pulse width modulation circuit which oscillates according to a time constant controlled by a resistor, the oscillation voltage stabilizing circuit comprising:
   a pulse input circuit, for detecting a high voltage induced in an output transformer;
   a forced trigger circuit, for inverting and amplifying a pulse transmitted from the pulse input circuit, and transmitting it to a capacitor terminal of the pulse width modulation circuit;
   a charge storage means, connected to a trigger terminal of the forced trigger circuit;
   a signal converter, for converting an output signal of the forced trigger circuit into a voltage;
   a voltage comparator having a first switching device, which is opened or closed according to the voltage transmitted from the signal converter;
   a control circuit having a second switching device, which is opened or closed according to an output of the voltage comparator; and
   a resistor circuit, for varying its resistance in response to a control signal transmitted by the control circuit.

2. The stabilizer according to claim 1, the forced trigger circuit including a first transistor having a base which receives a voltage divided by resistors from the pulse input circuit and having a collector which is connected to the capacitor terminal of the pulse width modulation circuit.

3. The stabilizer according to claim 1, the first switching device of the voltage comparator comprising a shunt regulator which receives the voltage transmitted by the signal converter at a reference input terminal and whose anode voltage is reduced to zero when the received voltage exceeds 2.5V.

4. The stabilizer according to claim 1, the second switching device in the control circuit comprising a transistor having a base which receives the output voltage from the voltage comparator through a zener diode, and controlling a parallel operation of resistors connected to its emitter and collector through its ON/OFF operation.

5. A display device comprising:
   an electric power supply circuit, for converting an alternating voltage into a direct voltage;
   a horizontal oscillator circuit, for forming a sawtooth waveform corresponding to a charging/discharging characteristic of a capacitor, and oscillating at a frequency, using the direct voltage supplied by the electric power supply circuit;
   a horizontal drive circuit, for supplying a base current for turning on and turning off a horizontal output transistor after amplifying an output pulse of the horizontal oscillator circuit, and for correcting the waveform;
   a horizontal output circuit, for generating a current with a sawtooth waveform through deflection coils in accordance with a switching operation of the horizontal output transistor, which is driven by a current that is supplied by the horizontal drive circuit;
   a horizontal regulation circuit, for transmitting a signal to the horizontal output circuit for regulating a horizontal size of a screen;
   a pulse width modulation circuit, for providing a regulated duty cycle value for a signal output to the horizontal regulation circuit; and
   an oscillation voltage stabilizing circuit, for stabilizing an oscillating operation of the pulse width modulation circuit, said oscillation voltage stabilizing circuit comprising:
      a pulse input circuit, for detecting a high voltage induced by an output transformer;
      a forced trigger circuit, for inverting and amplifying a pulse transmitted from the pulse input circuit, and transmitting it to a capacitor terminal of the pulse width modulation circuit;
      a charge storage means, connected to a trigger terminal of the forced trigger circuit;
      a signal converter, for converting an output signal of the forced trigger circuit into a voltage;
      a voltage comparator having a first switching device, which is opened or closed according to the voltage transmitted from the signal converter;
      a control circuit having a second switching device, which is opened or closed in accordance with a state of the voltage comparator; and
      a resistor circuit, for varying its resistance in response to a control signal transmitted by the control circuit.

6. The device according to claim 5, the forced trigger circuit comprising:
   a first transistor having a base which receives the voltage, that is divided by resistors, from the pulse input circuit, and having a collector which is connected to the capacitor terminal of the pulse width modulation circuit through its collector.

7. The device according to claim 5, the first switching device of the voltage comparator comprising:
   a shunt regulator, having a reference input which receives the voltage transmitted by the signal converter and whose anode voltage is reduced to zero when the received voltage exceeds 2.5V.

8. The device according to claim 5, the second switching device in the control circuit comprising:
   a transistor, having a base which receives the output voltage from the voltage comparator through a zener diode, and which controls the parallel operation of resistors connected to its emitter and collector through its on and off operation.

9. A display device comprising:
   a high voltage drive circuit for inducing a high voltage and for supplying it to an anode of a cathode-ray tube using an oscillation frequency of a horizontal oscillator circuit;

a high voltage output circuit for amplifying an output voltage supplied by the high voltage drive circuit to provide a driving voltage for a flyback transformer;

a high voltage regulation circuit, for regulating periods of an output of the high voltage output circuit;

a pulse width modulation circuit, for providing a regulated duty cycle value for adjusting a signal of the high voltage regulation circuit; and an oscillation voltage stabilizing circuit for stabilizing an oscillation operation of the pulse width modulation circuit, said oscillation voltage stabilizing circuit comprising:

a pulse input circuit, for detecting a high voltage induced in an output transformer;

a forced trigger circuit, for inverting and amplifying a pulse transmitted from the pulse input circuit, and transmitting it to a capacitor terminal of the pulse width modulation circuit;

a charge storage means, connected to a trigger terminal of the forced trigger circuit;

a signal converter for converting an output signal of the forced trigger circuit into a voltage;

a voltage comparator having a first switching device, which is opened or closed in accordance with the voltage transmitted from the signal converter;

a control circuit having a second switching device, which is opened or closed according to a state of the voltage comparator; and a resistor circuit, for varying its resistance in response to control signals transmitted by the control circuit.

10. The device according to claim 9, the forced trigger circuit comprising:

a first transistor having a base which receives the voltage, that is divided by resistors, from the pulse input circuit, and having a collector which is connected to the capacitor terminal of the pulse width modulation circuit.

11. The device according to claim 9, the first switching device of the voltage comparator comprising:

a shunt regulator having a reference input which receives the voltage transmitted by the signal converter, and whose anode voltage is reduced to zero when the received voltage exceeds 2.5V.

12. The device according to claim 9, the second switching device in the control circuit comprising:

a transistor having a base which receives the output voltage from the voltage comparator through a zener diode, and which controls a parallel operation of resistors connected to its emitter and collector through its on and off operation.

* * * * *